US012555509B2

(12) United States Patent
Lin et al.

(10) Patent No.: US 12,555,509 B2
(45) Date of Patent: Feb. 17, 2026

(54) INTELLIGENT TRANSPARENT LIGHT-SHIELDING SYSTEM

(71) Applicant: TONG YANG INDUSTRY CO., LTD., Tainan (TW)

(72) Inventors: Yi-Kuan Lin, Tainan (TW); Li-Hsuan Liu, Pingtung County (TW)

(73) Assignee: TONG YANG INDUSTRY CO., LTD., Tainan (TW)

( * ) Notice: Subject to any disclaimer, the term of this patent is extended or adjusted under 35 U.S.C. 154(b) by 710 days.

(21) Appl. No.: 17/979,085

(22) Filed: Nov. 2, 2022

(65) Prior Publication Data

US 2023/0154373 A1 May 18, 2023

Related U.S. Application Data

(60) Provisional application No. 63/280,692, filed on Nov. 18, 2021.

(51) Int. Cl.
*G09G 3/20* (2006.01)
*B60J 3/04* (2006.01)
*B60R 1/24* (2022.01)

(52) U.S. Cl.
CPC .............. *G09G 3/2011* (2013.01); *B60J 3/04* (2013.01); *B60R 1/24* (2022.01); *B60R 2300/30* (2013.01);
(Continued)

(58) Field of Classification Search
CPC ......... G09G 3/2011; G09G 2320/0233; G09G 2320/0271; G09G 2380/10; G09G 3/32;
(Continued)

(56) References Cited

U.S. PATENT DOCUMENTS 9,710,059 B2    7/2017  Leng
2008/0272999 A1*  11/2008  Kurokawa ........... G09G 3/3611
                                        345/89
(Continued)

FOREIGN PATENT DOCUMENTS

CN      101470287 A    7/2009
CN      101607520 B    12/2009
(Continued)

OTHER PUBLICATIONS

Kawashima et al. TW201723746, Display device and driving method of the same (Year: 2017).*
(Continued)

*Primary Examiner* — Bumsuk Won
*Assistant Examiner* — Rahman Abdur
(74) *Attorney, Agent, or Firm* — Best & Flanagan LLP

(57) ABSTRACT

An intelligent transparent light-shielding system applied to a vehicle includes a camera, a transparent display, and a processor. The processor converts an original driving image received from the camera into a grayscale image, converts the grayscale image into an anti-glare image according to a preset threshold, and transmits the anti-glare image to the transparent display for display. Pixels in the grayscale image with grayscale values equal to or lower than the preset threshold respectively correspond to pixels in the anti-glare image with grayscale values equal to a lower limit value. Pixels in the grayscale image with grayscale values greater than the preset threshold respectively correspond to pixels in the anti-glare image with grayscale values greater than the preset threshold. A light-shielding rate of the transparent display corresponds to the grayscale values of the pixels in the anti-glare image.

13 Claims, 15 Drawing Sheets

(52) U.S. Cl.
CPC ............... *G09G 2320/0233* (2013.01); *G09G 2320/0271* (2013.01); *G09G 2380/10* (2013.01)

(58) Field of Classification Search
CPC ........ G09G 3/36; G09G 2360/16; G09G 3/20; B60J 3/04; B60R 1/24; B60R 2300/30; H04N 5/202; H04N 5/21
USPC ........................................................ 359/609
See application file for complete search history.

(56) References Cited

U.S. PATENT DOCUMENTS

| | | | | |
|---|---|---|---|---|
| 2015/0146261 | A1* | 5/2015 | Subbaian | G06T 7/41 |
| | | | | 358/3.06 |
| 2016/0363993 | A1* | 12/2016 | Leng | G06F 3/013 |
| 2021/0090353 | A1 | 3/2021 | Miller | |

FOREIGN PATENT DOCUMENTS

| | | |
|---|---|---|
| CN | 103985334 B | 8/2014 |
| CN | 110727109 A | 1/2020 |
| JP | 2005-297716 A | 10/2005 |
| JP | 2008-242134 A | 10/2008 |
| JP | 2020-502567 A | 1/2020 |
| TW | 201541364 A | 11/2015 |
| TW | 201639350 A | 11/2016 |
| WO | 2005124431 A1 | 12/2005 |
| WO | 2020047486 A1 | 3/2020 |

OTHER PUBLICATIONS

Joo; TW 201543333, Wearable Device And Method Of Operating The Same (Year: 2015).*

Onishi et al. JP 2011248413, Image Processing Apparatus (Year: 2011).*

* cited by examiner

| (0,0) 225 | (1,0) 226 | (2,0) 226 | (3,0) 227 | (4,0) 227 | (5,0) 227 |
|---|---|---|---|---|---|
| (0,1) 225 | (1,1) 235 | (2,1) 237 | (3,1) 237 | (4,1) 225 | (5,1) 225 |
| (0,2) 224 | (1,2) 234 | (2,2) 236 | (3,2) 236 | (4,2) 220 | (5,2) 220 |
| (0,3) 220 | (1,3) 234 | (2,3) 235 | (3,3) 235 | (4,3) 220 | (5,3) 220 |
| (0,4) 215 | (1,4) 216 | (2,4) 216 | (3,4) 217 | (4,4) 217 | (5,4) 218 |
| (0,5) 210 | (1,5) 210 | (2,5) 210 | (3,5) 210 | (4,5) 210 | (5,5) 210 |

| (0,0) 0 | (1,0) 0 | (2,0) 0 | (3,0) 0 | (4,0) 0 | (5,0) 0 |
|---|---|---|---|---|---|
| (0,1) 0 | (1,1) 255 | (2,1) 255 | (3,1) 255 | (4,1) 0 | (5,1) 0 |
| (0,2) 0 | (1,2) 255 | (2,2) 255 | (3,2) 255 | (4,2) 0 | (5,2) 0 |
| (0,3) 0 | (1,3) 255 | (2,3) 255 | (3,3) 255 | (4,3) 0 | (5,3) 0 |
| (0,4) 0 | (1,4) 0 | (2,4) 0 | (3,4) 0 | (4,4) 0 | (5,4) 0 |
| (0,5) 0 | (1,5) 0 | (2,5) 0 | (3,5) 0 | (4,5) 0 | (5,5) 0 |

| (5,0) 0 | (5,1) 0 | (5,2) 0 | (5,3) 0 | (5,4) 0 | (5,5) 0 |
|---|---|---|---|---|---|
| (4,0) 0 | (4,1) 0 | (4,2) 0 | (4,3) 0 | (4,4) 0 | (4,5) 0 |
| (3,0) 0 | (3,1) 237 | (3,2) 236 | (3,3) 235 | (3,4) 0 | (3,5) 0 |
| (2,0) 0 | (2,1) 237 | (2,2) 236 | (2,3) 235 | (2,4) 0 | (2,5) 0 |
| (1,0) 0 | (1,1) 235 | (1,2) 234 | (1,3) 234 | (1,4) 0 | (1,5) 0 |
| (0,0) 0 | (0,1) 0 | (0,2) 0 | (0,3) 0 | (0,4) 0 | (0,5) 0 |

IM_out

| (0,0) 240 | (1,0) 226 | (2,0) 226 | (3,0) 227 | (4,0) 227 | (5,0) 227 |
|---|---|---|---|---|---|
| (0,1) 235 | (1,1) 242 | (2,1) 190 | (3,1) 146 | (4,1) 225 | (5,1) 225 |
| (0,2) 224 | (1,2) 100 | (2,2) 150 | (3,2) 203 | (4,2) 220 | (5,2) 220 |
| (0,3) 220 | (1,3) 195 | (2,3) 80 | (3,3) 250 | (4,3) 220 | (5,3) 220 |
| (0,4) 215 | (1,4) 216 | (2,4) 216 | (3,4) 217 | (4,4) 217 | (5,4) 218 |
| (0,5) 210 | (1,5) 210 | (2,5) 210 | (3,5) 210 | (4,5) 210 | (5,5) 237 |

FIG. 10A

IM_out

| (0,0) 240 | (1,0) 0 | (2,0) 0 | (3,0) 0 | (4,0) 0 | (5,0) 0 |
|---|---|---|---|---|---|
| (0,1) 235 | (1,1) 242 | (2,1) 0 | (3,1) 0 | (4,1) 0 | (5,1) 0 |
| (0,2) 0 | (1,2) 0 | (2,2) 0 | (3,2) 0 | (4,2) 0 | (5,2) 0 |
| (0,3) 0 | (1,3) 0 | (2,3) 0 | (3,3) 250 | (4,3) 0 | (5,3) 0 |
| (0,4) 0 | (1,4) 0 | (2,4) 0 | (3,4) 0 | (4,4) 0 | (5,4) 0 |
| (0,5) 0 | (1,5) 0 | (2,5) 0 | (3,5) 0 | (4,5) 0 | (5,5) 237 |

FIG. 10B

IM_out2

| | 0 | 1 | 2 | 3 | 4 | 5 |
|---|---|---|---|---|---|---|
| 0 | (0,0) 240 | (0,1) 235 | (0,2) 224 | (0,3) 0 | (0,4) 0 | (0,5) 0 |
| 1 | (1,0) 226 | (1,1) 242 | (1,2) 100 | (1,3) 0 | (1,4) 0 | (1,5) 0 |
| 2 | (2,0) 226 | (2,1) 190 | (2,2) 150 | (2,3) 80 | (2,4) 216 | (2,5) 0 |
| 3 | (3,0) 0 | (3,1) 0 | (3,2) 203 | (3,3) 250 | (3,4) 217 | (3,5) 0 |
| 4 | (4,0) 0 | (4,1) 0 | (4,2) 220 | (4,3) 220 | (4,4) 217 | (4,5) 210 |
| 5 | (5,0) 0 | (5,1) 0 | (5,2) 0 | (5,3) 0 | (5,4) 218 | (5,5) 237 |

FIG. 10C

IM_out2

| | 0 | 1 | 2 | 3 | 4 | 5 |
|---|---|---|---|---|---|---|
| 0 | (0,0) 240 | (0,1) 235 | (0,2) 230 | (0,3) 0 | (0,4) 0 | (0,5) 0 |
| 1 | (1,0) 230 | (1,1) 242 | (1,2) 230 | (1,3) 0 | (1,4) 0 | (1,5) 0 |
| 2 | (2,0) 230 | (2,1) 230 | (2,2) 230 | (2,3) 230 | (2,4) 230 | (2,5) 0 |
| 3 | (3,0) 0 | (3,1) 0 | (3,2) 230 | (3,3) 250 | (3,4) 230 | (3,5) 0 |
| 4 | (4,0) 0 | (4,1) 0 | (4,2) 230 | (4,3) 230 | (4,4) 230 | (4,5) 230 |
| 5 | (5,0) 0 | (5,1) 0 | (5,2) 0 | (5,3) 0 | (5,4) 230 | (5,5) 237 |

FIG. 10D

| (0,0) 255 | (1,0) 0 | (2,0) 0 | (3,0) 0 | (4,0) 0 | (5,0) 0 |
|---|---|---|---|---|---|
| (0,1) 255 | (1,1) 255 | (2,1) 0 | (3,1) 0 | (4,1) 0 | (5,1) 0 |
| (0,2) 0 | (1,2) 0 | (2,2) 0 | (3,2) 0 | (4,2) 0 | (5,2) 0 |
| (0,3) 0 | (1,3) 0 | (2,3) 0 | (3,3) 255 | (4,3) 0 | (5,3) 0 |
| (0,4) 0 | (1,4) 0 | (2,4) 0 | (3,4) 0 | (4,4) 0 | (5,4) 0 |
| (0,5) 0 | (1,5) 0 | (2,5) 0 | (3,5) 0 | (4,5) 0 | (5,5) 255 |

| (0,0) 255 | (1,0) 255 | (2,0) 255 | (3,0) 0 | (4,0) 0 | (5,0) 0 |
|---|---|---|---|---|---|
| (0,1) 255 | (1,1) 255 | (2,1) 255 | (3,1) 0 | (4,1) 0 | (5,1) 0 |
| (0,2) 255 | (1,2) 255 | (2,2) 255 | (3,2) 255 | (4,2) 255 | (5,2) 0 |
| (0,3) 0 | (1,3) 0 | (2,3) 255 | (3,3) 255 | (4,3) 255 | (5,3) 0 |
| (0,4) 0 | (1,4) 0 | (2,4) 255 | (3,4) 255 | (4,4) 255 | (5,4) 255 |
| (0,5) 0 | (1,5) 0 | (2,5) 0 | (3,5) 0 | (4,5) 255 | (5,5) 255 |

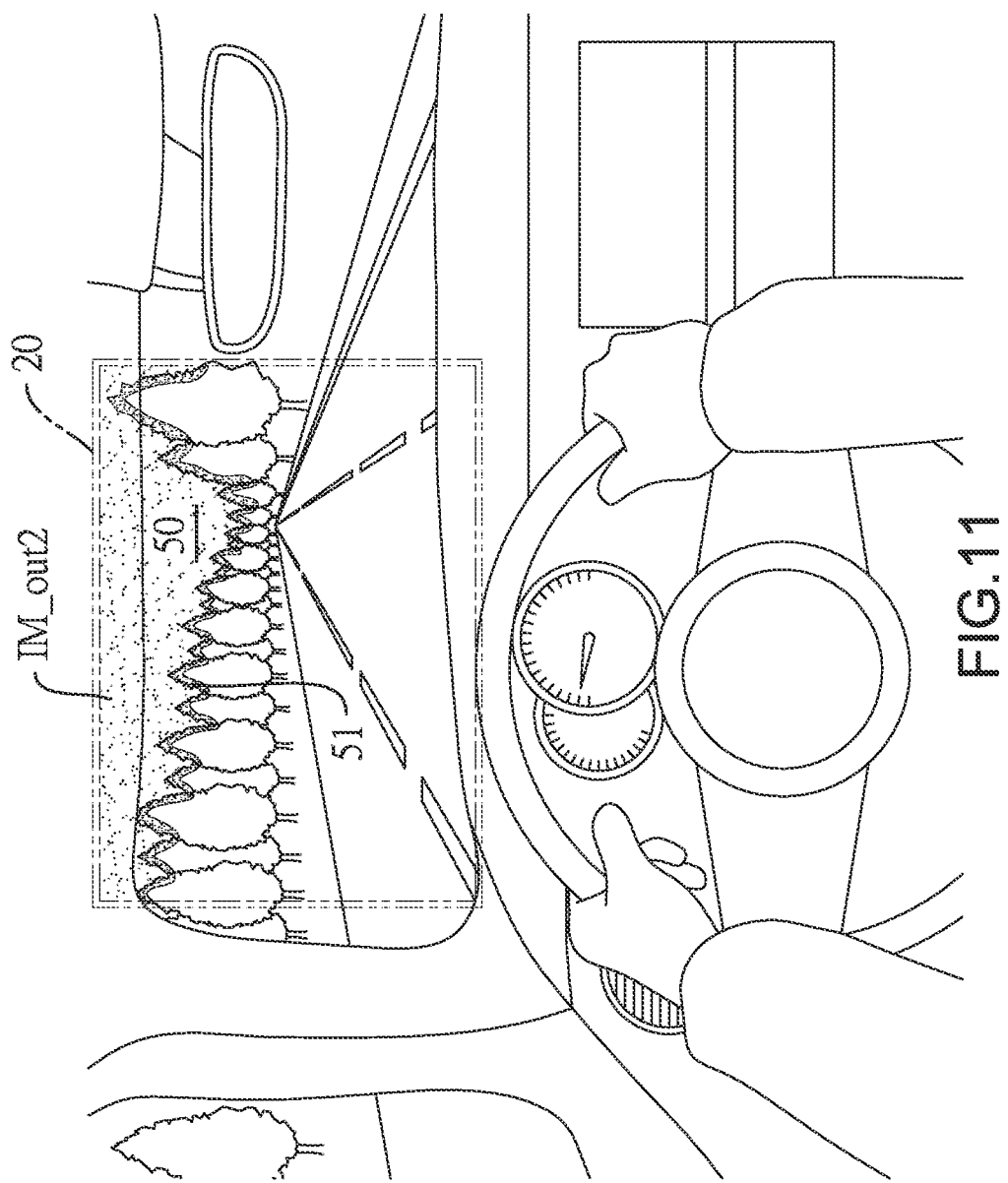

INTELLIGENT TRANSPARENT LIGHT-SHIELDING SYSTEM

CROSS REFERENCE TO RELATED APPLICATIONS

The present application claims priority to U.S. provisional application No. 63/280,692, filed on Nov. 18, 2021, the content of which is hereby incorporated by reference in its entirety.

BACKGROUND OF THE INVENTION

1. Field of the Invention

The present invention relates to a light-shielding system, in particular to an intelligent transparent light-shielding system.

2. Description of the Prior Arts

When driving, drivers sometimes encounter glare light sources such as sunlight, high beams of oncoming vehicles, etc., which may cause eye discomfort. More importantly, the driver cannot see the road ahead clearly in the case of glare light sources, which is disadvantageous to driving safety. Patent Publication No. CN 103985334B discloses a transparent display system. In the system, a transparent display unit is arranged at the windshield, and the transparent display unit realizes the light-shielding function in the projection area to be shaded, and the shape of the projection area is generally set as a circle or an ellipse.

In a trip of vehicle driving, the road landscape is changeable with different locations. For example, the vehicle may pass through tall buildings, street trees, and spacious fields, etc. along the way. Therefore, the shape of the glare light source is irregular for the driver as the road landscape changes. However, in the Patent Publication No. CN 103985334B, the light-shielding area provided by the transparent display unit is a circle or an ellipse. It is to be understood that the light-shielding area of the circle or ellipse not only covers the glare light source, but also covers the road landscape of the non-glare light source, resulting in excessive light shielding. Overall, the road landscape seen by the driver through the transparent display unit is darker, so there is a disadvantage of poor sight line.

SUMMARY OF THE INVENTION

In view of the above-mentioned problem, the present invention provides an intelligent transparent light-shielding system to overcome the disadvantage of excessive light shielding caused by the circular or elliptical light-shielding area as disclosed in the prior art.

The intelligent transparent light-shielding system of the present invention is applied to a vehicle and comprises:
  a camera generating an original driving image;
  a transparent display displaying an anti-glare image; and
  a processor signally connected to the camera and the transparent display, receiving the original driving image from the camera, converting the original driving image into a grayscale image, converting the grayscale image into the anti-glare image according to a preset threshold, and transmitting the anti-glare image to the transparent display for display;
  wherein each pixel in the grayscale image has a grayscale value, and each pixel in the anti-glare image has a grayscale value;
  wherein the pixels in the grayscale image with the grayscale values equal to or lower than the preset threshold respectively correspond to the pixels in the anti-glare image with the grayscale values equal to a lower limit value;
  wherein the pixels in the grayscale image with the grayscale values greater than the preset threshold respectively correspond to the pixels in the anti-glare image with the grayscale values greater than the preset threshold;
  wherein a light-shielding rate of the transparent display corresponds to the grayscale values of the pixels in the anti-glare image.

According to the intelligent transparent light-shielding system of the present invention, when the camera captures a glare light source, the original driving image includes pixels corresponding to the glare light source. The present invention converts the original driving image into the anti-glare image. The grayscale values of some pixels in the anti-glare image can directly reflect the shape and brightness of the glare light source. Namely, the pixels in the anti-glare image corresponding to the glare light source will have the grayscale values higher than the preset threshold, which can be displayed as a mask pattern.

Therefore, when the transparent display displays the anti-glare image, the mask pattern and the light-shielding rate from the transparent display correspond to the shape and brightness of the glare light source, so a light-shielding effect is provided against the glare light source. Therefore, if the shape of the glare light source is an irregular shape, the mask pattern is also a corresponding irregular shape. If the brightness of the glare light source is higher, the light-shielding rate provided by the mask pattern is also higher. On the other hand, the other part of the transparent display excluded from the shape of the glare light source maintains a transparent state that does not shield light. The present invention effectively overcomes the disadvantage of excessive light shielding caused by the circular or elliptical light-shielding area in the prior art.

BRIEF DESCRIPTION OF THE DRAWINGS

FIG. 7A is a schematic diagram of an example of a pixel matrix of a grayscale image in the present invention.

FIG. 7B is a schematic diagram of an example of a pixel matrix of a thresholding image in the present invention.

FIG. 7C is a schematic diagram of an example of a pixel matrix of an anti-glare image in the present invention.

FIG. 10A is a schematic diagram of another example of a pixel matrix of a grayscale image in the present invention.

FIG. 10B is a schematic diagram of a pixel matrix of an anti-glare image converted from FIG. 10A in the present invention, wherein the anti-glare image includes mask pixels.

FIG. 10C is a schematic diagram of a pixel matrix of an anti-glare image converted from FIG. 10B in the present invention, wherein the anti-glare image includes mask pixels and auxiliary mask pixels.

FIG. 10D is a schematic diagram of a pixel matrix of another anti-glare image converted from FIG. 10B in the present invention, wherein the anti-glare image includes mask pixels and auxiliary mask pixels.

FIG. 10E is a schematic diagram of a pixel matrix of a thresholding image converted from FIG. 10A in the present invention.

FIG. 10F is a schematic diagram of a pixel matrix of a transitional image converted from FIG. 10E in the present invention.

FIG. 11 is a schematic diagram of the scene in front of the driver, wherein the anti-glare image displayed by the transparent display includes a mask pattern and an auxiliary mask.

DETAILED DESCRIPTION OF THE PREFERRED EMBODIMENTS

Figure 1:
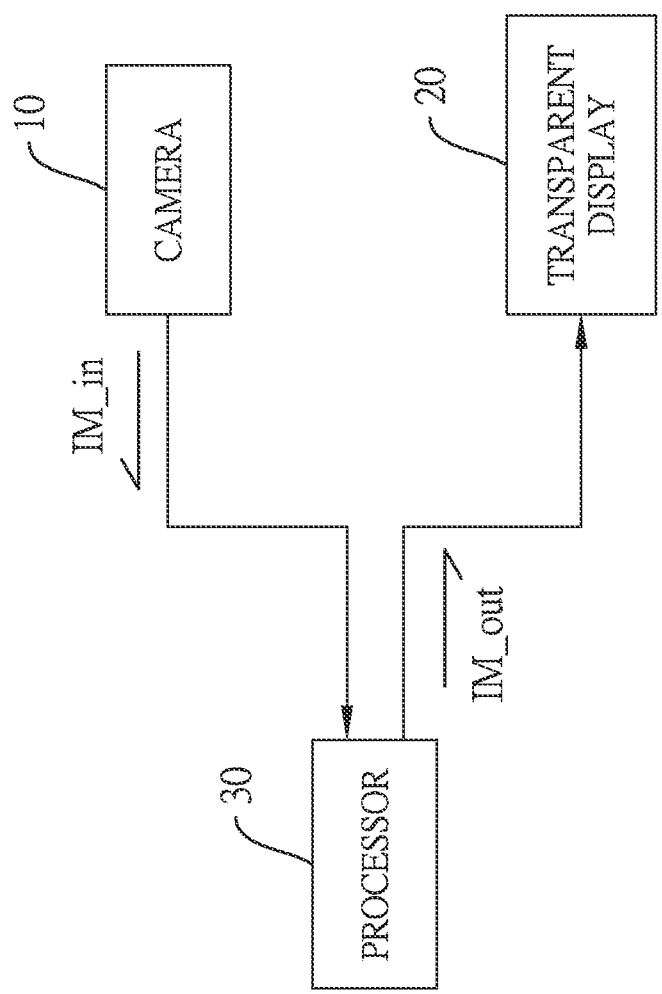
FIG. 1 is a schematic block diagram of the intelligent transparent light-shielding system of the present invention.
Figure 2:
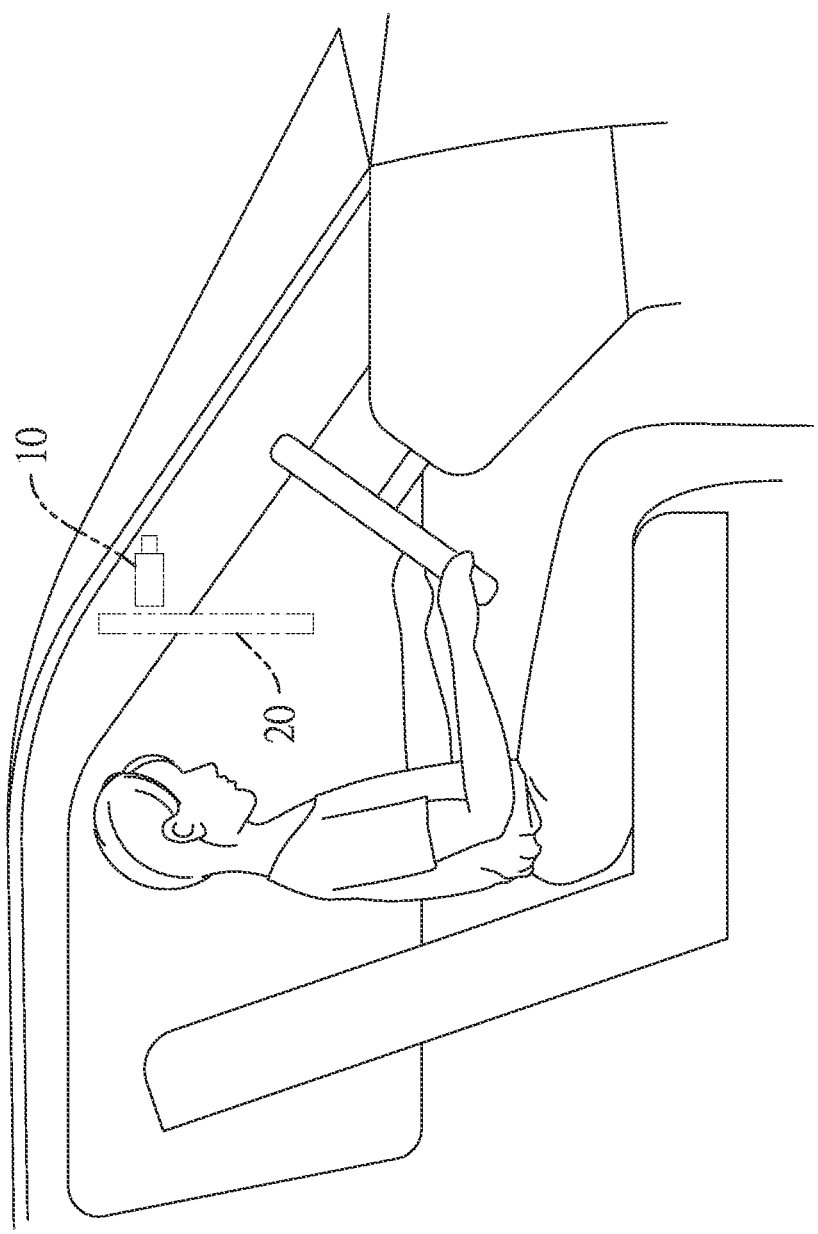
FIG. 2 is a schematic diagram of the positions of the camera and the transparent display in the present invention.

An intelligent transparent light-shielding system of the present invention can be applied to a vehicle, such as a car, a sport utility vehicle, and a railway vehicle, but not limited to them. The invention can automatically shield the strong light from the front of the vehicle for the driver, to prevent the driver from feeling glare due to the strong light. At the same time, the driver can clearly see the non-glare scene in front of the vehicle through the present invention, thereby taking into account the road conditions ahead. Referring to FIG. 1 and FIG. 2, an embodiment of the intelligent transparent light-shielding system of the present invention comprises a camera 10, a transparent display 20, and a processor 30.

The shooting direction of the camera 10 corresponds to the line of sight of the driver when the driver is driving, and is towards the front of the vehicle, so that the camera 10 generates an original driving image IM_in. Preferably, the camera 10 is positioned at the same height as the driver's eyes. The camera 10 may be mounted on an adjustable rack (not shown in the figures). The adjustable rack may be fixed, for example, to the inside of the windshield or the like, or incorporated in the frame or housing of the transparent display 20, as long as it is possible for the camera 10 to shoot in a direction corresponding to the driver's line of sight when driving.

The transparent display 20 may be a transparent liquid crystal display screen or a transparent organic light emitting diode (OLED) display screen. The transparent display 20 is arranged in front of the driver's sight line. The driver can see the scene in front of the vehicle through the transparent display 20. The transparent display 20 can be fixed on the inside of the windshield, or can be arranged in another adjustable bracket (not shown in the figure), as long as the transparent display 20 can be positioned in front of the driver's sight line. Or, the transparent display 30 may be a transparent liquid crystal display panel or a transparent OLED display panel in the configuration of eyeglass lens, which is mounted in an eyeglass frame. When the driver wears the eyeglass frame, the driver can see the scene in front of the vehicle through the transparent display 20.

Figure 3:
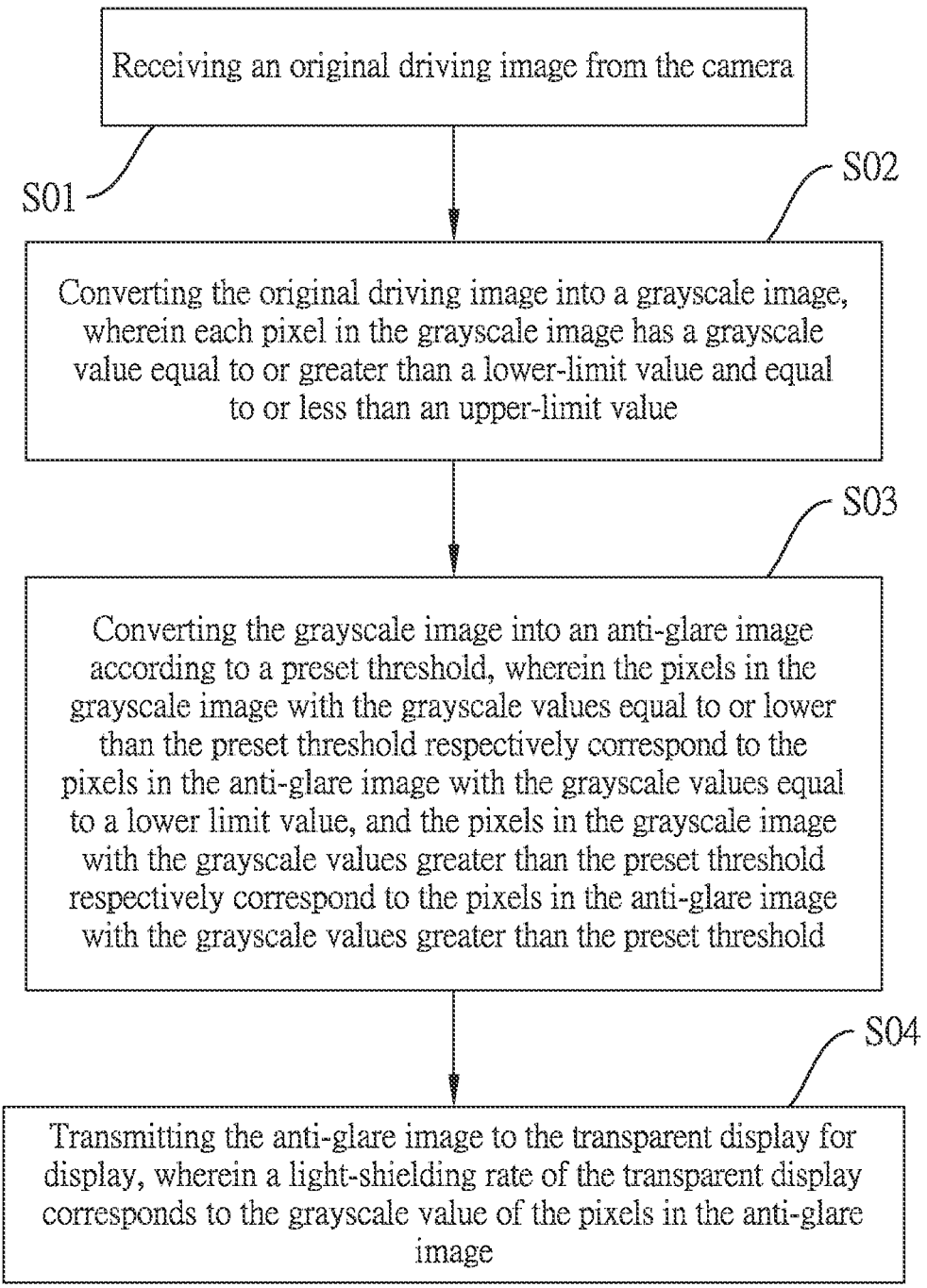
FIG. 3 is a flowchart of the collaboration of a processor, a camera, and a transparent display in the present invention.

The processor 30 may be a circuit module of a micro control unit (MCU), a central processing unit (CPU), or a graphic processing unit (GPU). The processor 30 is signally connected to the camera 10 and the transparent display 20. For example, the processor 30 can be respectively connected to the camera 10 and the transparent display 20 through Low-Voltage Differential Signaling (LVDS) or Embedded Display Port (EDP) connectors and cables. It is also understandable that, when the processor 30 process an image, the processor 30 can define the positions of the pixels in the image according to the pixel coordinates, and read/write color information of each pixel, such as a grayscale value and an intensity value. Referring to FIG. 1 and FIG. 3, the steps performed by the processor 30 are described below.

Step S01: the processor 30 receives the original driving image IM_in from the camera 10. An example of the original driving image IM_in can refer to FIG. 4. Generally, the original driving image IM_in is a color image. As the shooting direction of the camera 10 corresponds to the sight line of the driver when driving, the content of the original driving image IM_in corresponds to the scene seen by the driver's eyes. The original driving image IM_in includes a road 41, street trees 42, and the sky 43 in front of the vehicle. For the convenience of description, the sky 43 has a glare sunlight.

Figure 4:
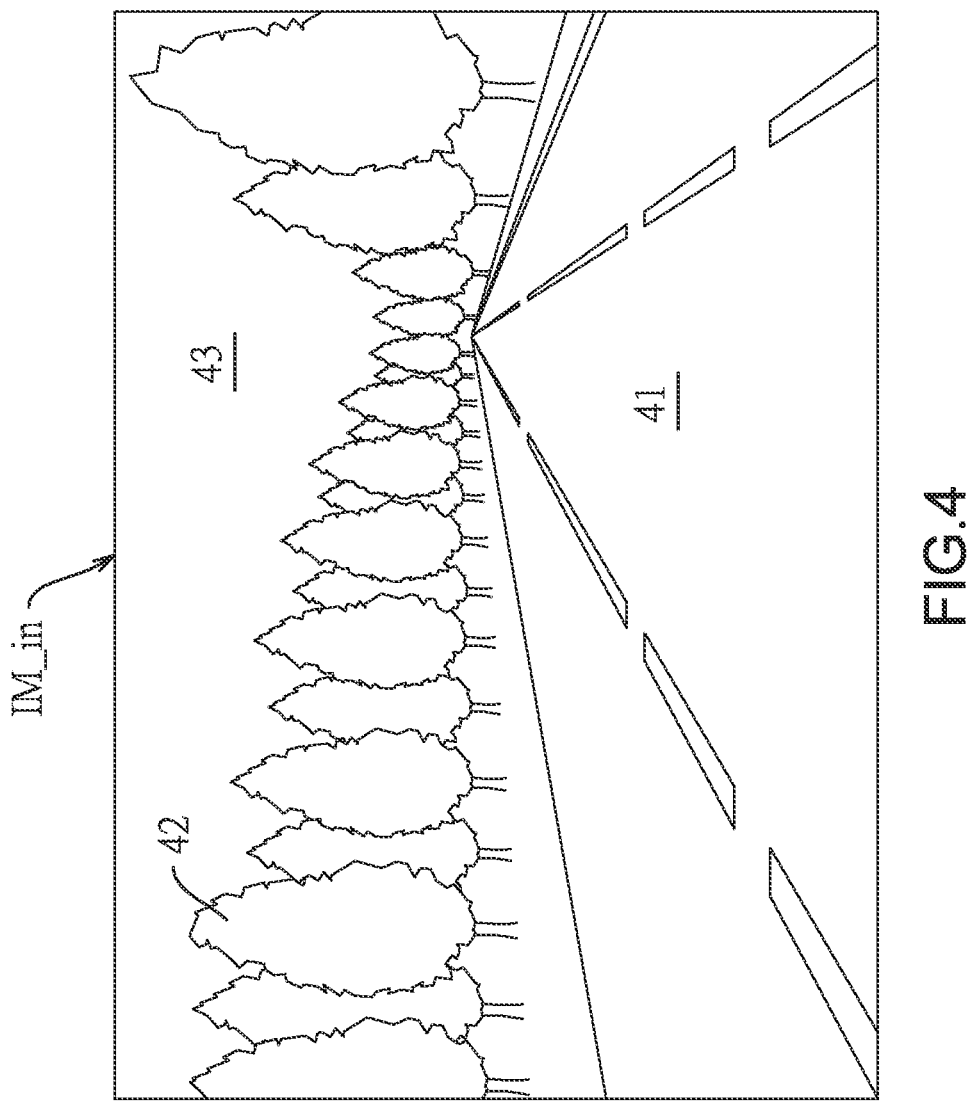
FIG. 4 is a schematic diagram of an original driving image captured by the camera in the present invention.
Figure 5A:
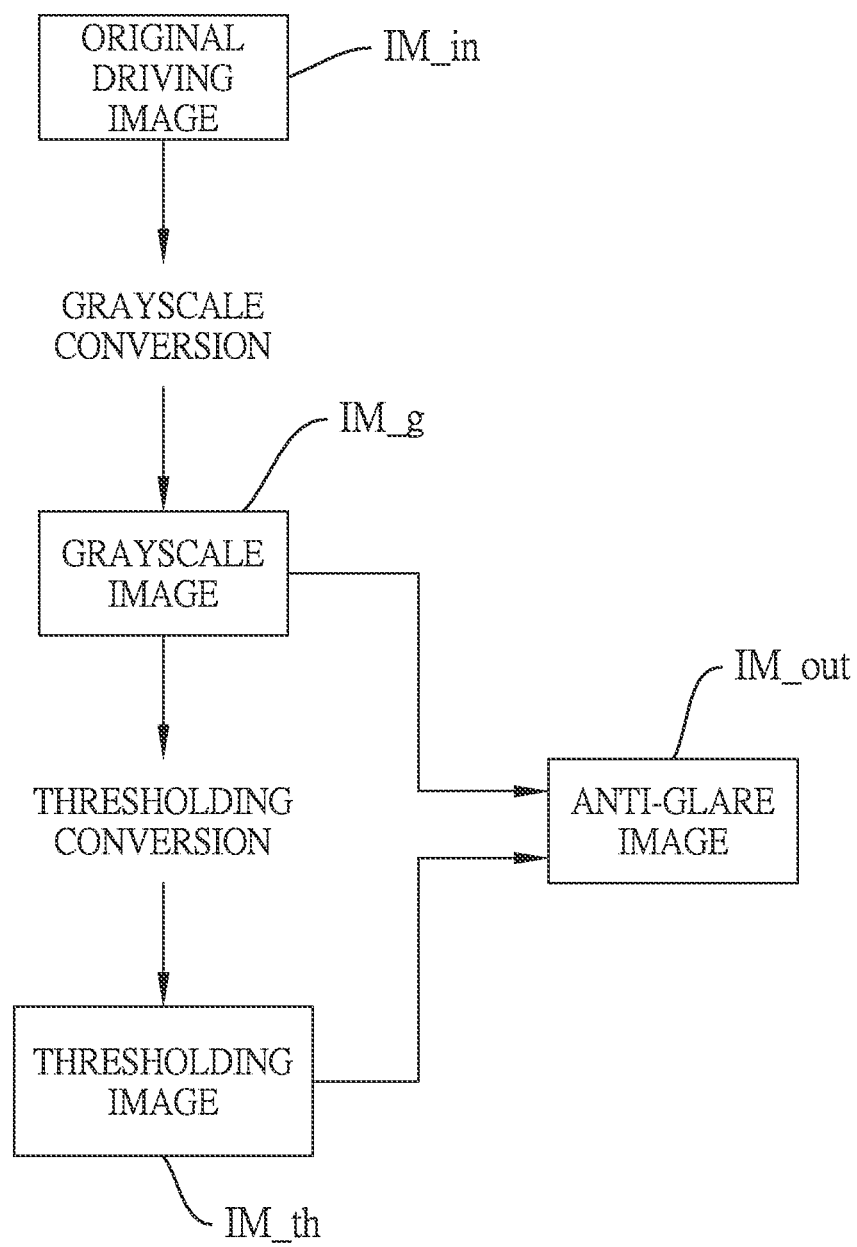
FIG. 5A is a flow schematic diagram of conversion from the original driving image to the anti-glare image in the present invention.

Step S02: Referring to FIG. 5A, the processor 30 performs a grayscale conversion to convert the original driving image IM_in into a grayscale image IM_g, wherein the grayscale conversion is a common knowledge in the field of image processing. Each pixel in the grayscale image IM_g has a grayscale value. The processor 30 can store the grayscale value of each pixel in the grayscale image IM_g in a memory. The grayscale value is equal to or greater than a lower-limit value and equal to or less than an upper-limit value. For example, the lower-limit value can be 0, and the upper-limit value can be 255, that is, the grayscale value is equal to or greater than 0 and equal to or less than 255. In the grayscale image IM_g, a pixel with a grayscale value of 0 appears pure black. As the grayscale value increases, the color tone of the pixel changes from dark gray to light gray. Therefore, a pixel with a grayscale value of 255 appears pure white. Taking FIG. 4 as an example, the sky 43 in FIG. 4 has glare sunlight. Therefore, it can be understood that some pixels of the grayscale image IM_g corresponding to the sky 43 have higher grayscale values.

Step S03: The processor 30 converts the grayscale image IM_g into an anti-glare image IM_out. Each pixel in the anti-glare image IM_out has a grayscale value. In a first embodiment of Step S03, the processor 30 performs a thresholding conversion to convert the grayscale image IM_g into a thresholding image IM_th, and then convert the grayscale image IM_g into the anti-glare image IM_out according to pixel information of the thresholding image IM_th. Besides, in a second embodiment of Step S03, the processor 30 may directly convert the grayscale image IM_g into the anti-glare image IM_out. The first embodiment and the second embodiment of Step S03 are disclosed as follows.

1. The First Embodiment of Step S03

Figure 6:
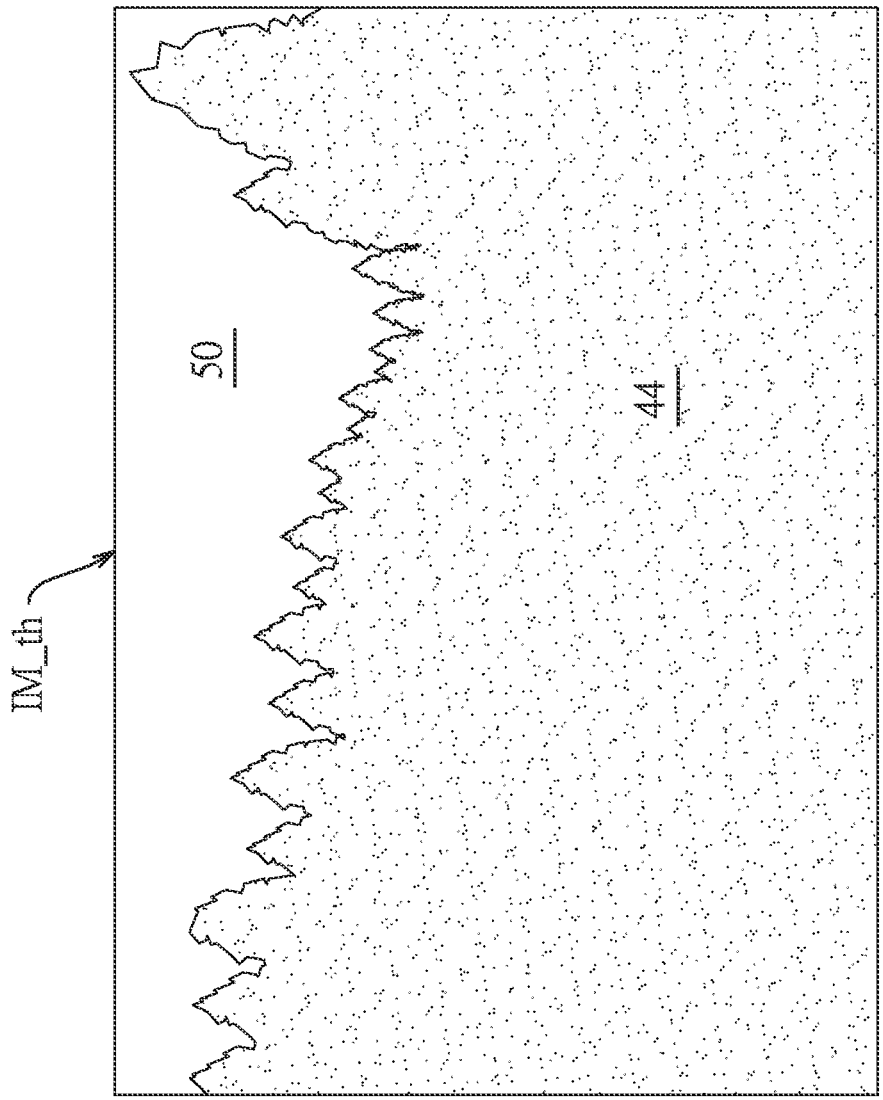
FIG. 6 is a schematic diagram of a thresholding image in the present invention.

The thresholding conversion from the grayscale image IM_g into the thresholding image IM_th is a common knowledge in the field of image processing. Therefore, each pixel in the thresholding image IM_th has an intensity value, and the intensity value is equal to the lower-limit value (0) or the upper-limit value (255). In the embodiment of the present invention, the processor 30 compares the grayscale value of each pixel in the grayscale image IM_g with a preset threshold. The preset threshold may be a value equal to or greater than 160 and equal to or less than 240, that is, 160 preset threshold 240. The processor 30 sets the pixels in the grayscale image IM_g whose grayscale values are equal to or smaller than the preset threshold as the pixels in the thresholding image IM_th whose intensity value is the lower-limit value (0), and sets the pixels in the grayscale image IM_g whose grayscale values are greater than the preset threshold as the pixels in the thresholding image IM_th whose intensity value is the upper-limit value (255). In addition, the processor 30 stores the intensity value corresponding to each pixel in the thresholding image IM_th in the memory. FIG. 6 is the thresholding image IM_th corresponding to FIG. 4. Among all the pixels of the thresholding image IM_th, the intensity values of some pixels of the sky 43 corresponding to FIG. 4 is 255, and a mask pattern 50 is presented. The intensity values of the pixels of the other part 44 excluded from the sky 43 are 0.

After the thresholding image IM_th is generated, the processor 30 converts the grayscale image IM_g into the anti-glare image IM_out according to the pixel information, including the pixel coordinates and the intensity values, of the thresholding image IM_th. In the present invention, the grayscale value in the anti-glare image IM_out corresponding to the pixel whose intensity value in the thresholding image IM_th is equal to the lower-limit value (0) is set to be the lower-limit value (0) by the processor 30. The grayscale value in the anti-glare image IM_out corresponding to the pixel whose intensity value in the thresholding image IM_th is equal to the upper-limit value (255) is maintained as in the grayscale image IM_g by the processor 30. Namely, the pixels in the grayscale image IM_g with the grayscale values equal to or lower than the preset threshold respectively correspond to the pixels in the anti-glare image IM_out with the grayscale values equal to the lower limit value (0); and the pixels in the grayscale image IM_g with the grayscale values greater than the preset threshold respectively correspond to the pixels in the anti-glare image IM_out with the grayscale values greater than the preset threshold. Hence, the anti-glare image IM_out also includes the mask pattern 50 as shown in FIG. 6. Pixels of the mask pattern 50 of the anti-glare image IM_out will have the same grayscale values as the corresponding pixels of the grayscale image IM_g, which are greater than the preset threshold. The grayscale values of the pixels in the anti-glare image IM_out corresponding to the other parts 44 in FIG. 6 are 0.

The following description will explain the image processing from Step S02 to the first embodiment of Step S03 via simple figure examples. FIG. 7A shows pixel information of a grayscale image IM_g in a 6×6-pixel matrix, which includes pixel coordinates recited in parentheses and grayscale values located below the pixel coordinates. FIG. 7B shows pixel information of the thresholding image IM_th corresponding to FIG. 7A, wherein the preset threshold can be set to 230, so the pixels whose grayscale values are equal to or less than 230 in FIG. 7A correspond to the pixels whose intensity value is equal to 0 in FIG. 7B. Pixels with the grayscale values greater than 230 in FIG. 7A correspond to pixels with the intensity values equal to 255 in FIG. 7B. FIG. 7C is an anti-glare image IM_out generated according to the pixel information of the grayscale image IM_g and the thresholding image IM_th. The pixel with the grayscale value of 0 in FIG. 7C corresponds to the pixel with the intensity value equal to 0 in FIG. 7B. In FIG. 7C, the coordinates of the pixels with non-zero grayscale values correspond to the coordinates of the pixels with the intensity values equal to 255 in FIG. 7B. The non-zero grayscale values in FIG. 7C, which are greater than the preset threshold, correspond to the grayscale values of the corresponding pixels in FIG. 7A.

2. The Second Embodiment of Step S03

Figure 5B:
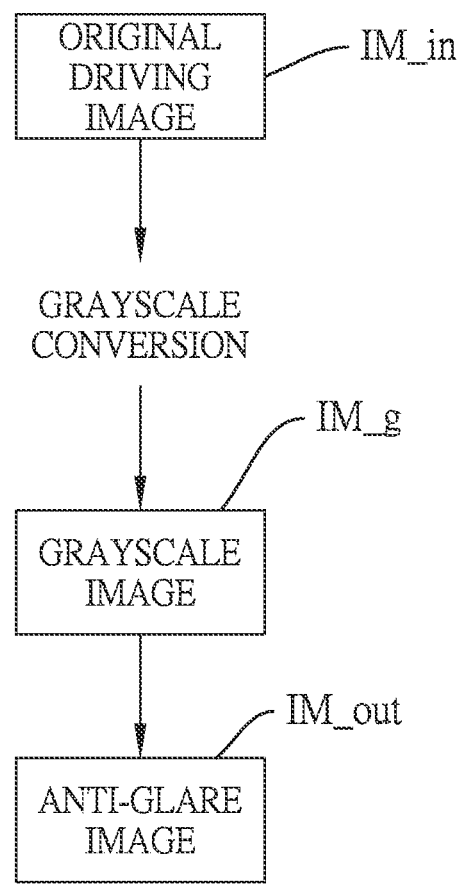
FIG. 5B is a flow schematic diagram of another conversion from the original driving image to the anti-glare image in the present invention.

In the second embodiment of Step S03 of the present invention, as shown in FIG. 5B, the processor 30 converts grayscale image IM_g into the anti-glare image IM_out directly according to the preset threshold. Namely, the processor 30 will not convert the grayscale image IM_g into the thresholding image IM_th. By directly comparing the grayscale vale of each pixel of the grayscale image IM_g with the preset threshold, the processor 30 sets the pixels of the grayscale image IM_g with the grayscale values equal to or lower than the preset threshold as the pixels of the anti-glare image IM_out with the grayscale values equal to the lower-limit value (0), and sets the pixels of the grayscale image IM_g with the grayscale values greater than the preset threshold as the pixels of the anti-glare image IM_out with the grayscale value greater than the preset threshold. Namely, the above-mentioned FIG. 7A is directly converted into FIG. 7C. In comparison with the first embodiment of Step S03, the second embodiment of Step S03 without the thresholding conversion may improve the image conversion speed and efficiency comparatively.

Figure 8:
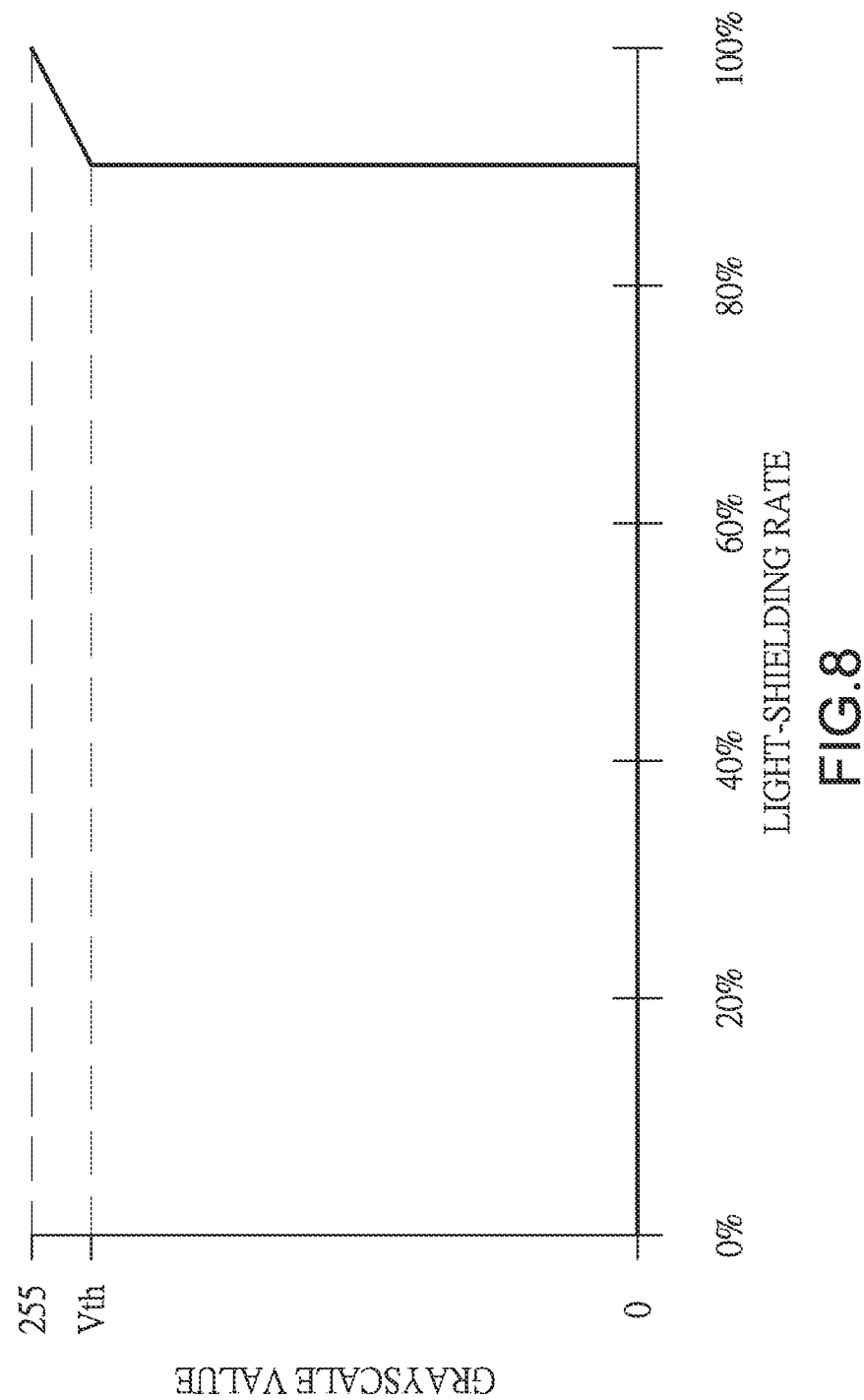
FIG. 8 is a graph showing the relationship between the grayscale value of pixels in the anti-glare image and the light-shielding rate of the transparent display in the present invention.

Step S04: The processor 30 transmits the anti-glare image IM_out to the transparent display 20. The transparent display 20 displays according to the grayscale value of each pixel in the anti-glare image IM_out. Therefore, the anti-glare image IM_out also includes the mask pattern 50 shown in FIG. 6. It can be understood that the pixel with a grayscale value of 0 displayed on the transparent display 20 is equivalent to a transparent state, which corresponds to a minimum light-shielding rate (0%). In contrast, the transparent display 20 displays a pixel with a grayscale value of 255 as pure black, which corresponds to a maximum light-shielding rate (100%). And so on, as shown in FIG. 8, the light-shielding rate of the transparent display 20 is positively proportional to the grayscale value (greater than the preset threshold Vth) of each pixel in the anti-glare image IM_out.

Figure 9:
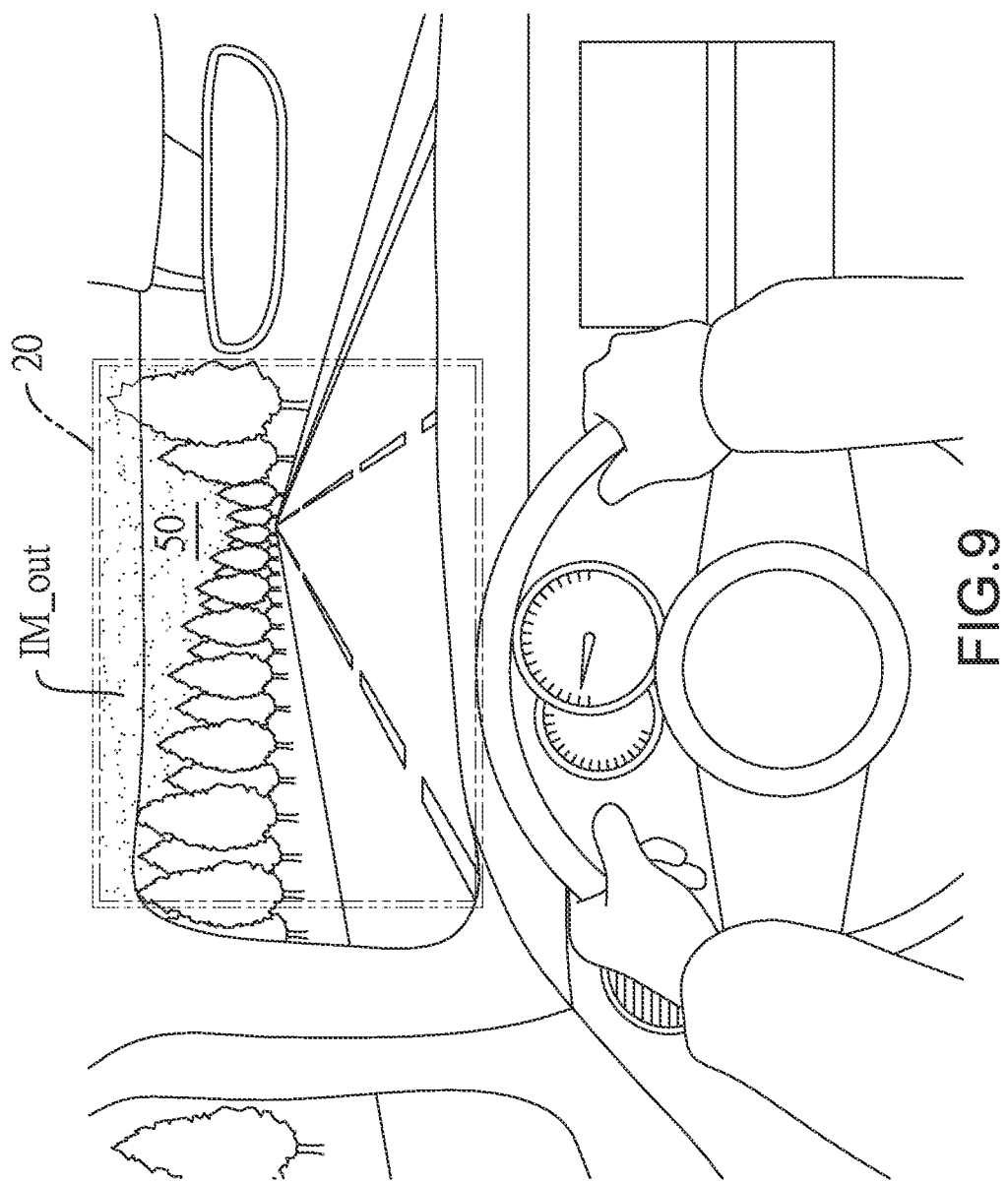
FIG. 9 is a schematic diagram of the scene in front of the driver, wherein the anti-glare image displayed by the transparent display includes a mask pattern.

Referring to FIG. 9 showing the scene in front of the driver. When the transparent display 20 displays the anti-glare image IM_out, the distribution range of the mask pattern 50 covers the position of the glare sunlight in the sky 43 as shown in FIG. 4, thereby achieving a light-shielding effect. It is also understandable that as the vehicle moves on, the scene in front of the vehicle changes continuously. A strong light distribution area (the glare sunlight) in the original driving image IM_in received by the processor 30 also changes. Based on the image processing in Steps S02 to S04, the mask pattern 50 of the anti-glare image IM_out is also dynamically changed, and can conform to the strong light distribution area in the original driving image IM_in.

In order to expand the light-shielding range of the mask pattern 50 of the anti-glare image IM_out, the present invention provides the following embodiments and simple figure examples to disclose the formation of an auxiliary mask expended from the mask pattern 50. FIG. 10A shows the pixel information of another grayscale image IM_g represented by a 6×6-pixel matrix.

1. A First Embodiment to Form the Auxiliary Mask

With reference to the above-mentioned Steps S02 and S03, the processor 30 may convert the grayscale image IM_g as shown in FIG. 10A into the anti-glare image IM_out as shown in FIG. 10B. Further, in the anti-glare image IM_out, each pixel with the grayscale value greater than the preset threshold is defined as a mask pixel, and each pixel with the grayscale value equal to the lower-limit value (0) is defined as a non-mask pixel. As a result, the coordinates of the mask pixels include (0,0), (0,1), (1,1), (3, 3) and (5, 5), and the rest of the pixels are non-mask pixels. The processor 30 sets each mask pixel in the anti-glare image IM_out as a base to define an M×N matrix according to the base, sets the non-mask pixel in the M×N matrix as an auxiliary mask pixel, and sets the grayscale value of the auxiliary mask pixel to be equal to the grayscale value of the corresponding pixel of the grayscale image IM_g. Wherein, the mask pixel as the base to define the M×N matrix may be a center pixel of the M×N matrix. Or, the mask pixel as the base to define the M×N matrix may be a non-center pixel of the M×N matrix, such as a corner pixel or an edge pixel. M and N are adjustable preset values, M and N are positive integers greater than or equal to 2 respectively, and M may be equal to or not equal to N. For example, M=N=3, and the preset threshold is 230. Therefore, as shown in FIG. 10B, a 3×3 matrix is defined according to each mask pixel as the base (center). Taking the coordinates (3, 3) of the mask pixel as an example, its auxiliary mask pixels include the pixels in coordinates (2,2), (3,2), (4,2), (2,3), (4,3), (2,4), (3,4) and (4,4). The expansion for the rest of the mask pixels can be deduced from the mask pixel in (3,3). Therefore, comparing FIG. 10C with FIG. 10B, the anti-glare image IM_out2 of FIG. 10C has not only the mask pixels, but also the auxiliary mask pixels. The mask pixels and the auxiliary mask pixels as a whole have a wider distribution of light-shielding pixels (including the mask pixels and the auxiliary mask pixels) than FIG. 10B to achieve the expansion of the light-shielding range.

As mentioned above, the grayscale value of the auxiliary mask pixel is set to be equal to the grayscale value of the corresponding pixel of the grayscale image IM_g. Besides, with reference to FIG. 10D, the grayscale value of the auxiliary mask pixel can be set to be equal to the preset threshold. Therefore, in comparison with FIG. 10B, the anti-glare image IM_out2 of FIG. 10D has more pixels with grayscale values greater than or equal to the preset threshold, and has a wider distribution of light-shielding pixels (including the mask pixels and the auxiliary mask pixels) to achieve the expansion of the light-shielding range.

2. A Second Embodiment to Form the Auxiliary Mask

With reference to the above-mentioned Step S02 and the second embodiment of Step S03, the processor 30 may convert the grayscale image IM_g as shown in FIG. 10A into the thresholding image IM_th as shown in FIG. 10E. Further, in FIG. 10E, each pixel with the intensity value equal to the upper-limit value (255) is defined as a mask pixel, and each pixel with the intensity value equal to the lower-limit value (0) is defined as a non-mask pixel. As a result, the coordinates of the mask pixels include (0,0), (0,1), (1,1), (3, 3) and (5, 5), and the rest of the pixels are non-mask pixels. The processor 30 sets each mask pixel in the thresholding image IM_th as a base to define an M×N matrix according to the base, sets the non-mask pixel in the M×N matrix as an auxiliary mask pixel, and sets the intensity value of the auxiliary mask pixel to be equal to the upper-limit value (255) to form a transitional image IM_x as shown in FIG. 10F. Each pixel of the transitional image IM_x has a grayscale value. Wherein, the mask pixel may be defined at a center or non-center of the M×N matrix. M and N are adjustable preset values, M and N are positive integers greater than or equal to 2 respectively, and M may be equal to or not equal to N. For example, M=N=3, and the preset threshold is 230. Therefore, as shown in FIG. 10F, a 3×3 matrix is defined according to each mask pixel as the base (center). Taking the coordinates (3, 3) of the mask pixel as an example, its auxiliary mask pixels include the pixels in coordinates (2,2), (3,2), (4,2), (2,3), (4,3), (2,4), (3,4) and (4,4). The expansion for the rest of the mask pixels can be deduced from the mask pixel in (3,3). Therefore, comparing FIG. 10F with FIG. 10E, the transitional image IM_x of FIG. 10F has more pixels with grayscale values equal to the upper-limit value (255) than FIG. 10E, and has wider distribution of light-shielding pixels (including the mask pixels and the auxiliary mask pixels) than FIG. 10E. Then, the processor 30 sets the grayscale values of the mask pixels and the auxiliary mask pixels of the transitional image IM_x to be equal to the grayscale values of the corresponding pixels of the grayscale image IM_g. Therefore, the transitional image IM_x as shown in FIG. 10F can be converted into the anti-glare image IM_out2 as shown in FIG. 10C.

The generation principle of the auxiliary mask pixels has been described above. Therefore, in Step S04, the processor 30 transmits the anti-glare image IM_out2 including the mask pixels and the auxiliary mask pixels to the transparent display 20. The transparent display 20 displays according to the grayscale values of the mask pixels and the auxiliary mask pixels in the anti-glare image IM_out2. Referring to FIG. 11, when the transparent display 20 displays the anti-glare image IM_out2, in addition to the mask pattern 50, it further includes an auxiliary mask 51 formed by the auxiliary mask pixels. The auxiliary mask 51 still provides light shielding along the shape of the sky 43 of the original driving image IM_in shown in FIG. 4, so this embodiment can provide a wider range of light-shielding effect by the combination of the mask pattern 50 and the auxiliary mask 51.

In summary, the present invention may achieve effects as follows.

1. When the camera 10 captures a glare light source, the grayscale values of some pixels in the anti-glare image IM_out directly reflect the shape and brightness of the glare light source. When the transparent display 20 displays the anti-glare image IM_out, the shape and light-shielding rate of the mask pattern 50 provided by the transparent display 20 can correspond to the shape and brightness of the glare light source, so as to provide a light-shielding effect. The other part of the transparent display 20 excluded from the shape of the glare light source maintains a transparent state that does not shield light.

2. As the vehicle moves on, the scene in front of the vehicle changes continuously, the mask pattern 50 of the anti-glare image IM_out also changes dynamically. The shape of the mask pattern 50 always corresponds to the shape of the glare light source.

3. The combination of the mask pattern 50 and the auxiliary mask 51 can provide a wider range of light-shielding effect. The auxiliary mask 51 still provides light-shielding along the shape of the glare light source, which will not cause excessive light shielding.

4. Even if the camera 10 captures multiple glare light sources, the anti-glare image IM_out is generated according to the pixel information of the grayscale image IM_g and the thresholding image IM_th. It can be understood that the grayscale values of some pixels in the anti-glare image IM_out will respectively and directly reflect the shapes and brightness of the multiple glare light sources. So, when the transparent display 20 displays the anti-glare image IM_out, it can also display multiple mask patterns 50 corresponding to the multiple glare light sources to provide the light-shielding effect against the multiple glare light sources.

What is claimed is:

1. An intelligent transparent light-shielding system applied to a vehicle and comprising:
    a camera generating an original driving image;
    a transparent display displaying an anti-glare image; and
    a processor signally connected to the camera and the transparent display, receiving the original driving image from the camera, converting the original driving image into a grayscale image, converting the grayscale image into the anti-glare image according to a preset threshold, and transmitting the anti-glare image to the transparent display for display;
    wherein each pixel in the grayscale image has a grayscale value, and each pixel in the anti-glare image has a grayscale value;
    wherein the pixels in the grayscale image with the grayscale values equal to or lower than the preset threshold respectively correspond to the pixels in the anti-glare image with the grayscale values equal to a lower limit value;
    wherein the pixels in the grayscale image with the grayscale values greater than the preset threshold respectively correspond to the pixels in the anti-glare image with the grayscale values greater than the preset threshold;
    wherein a light-shielding rate of the transparent display corresponds to the grayscale values of the pixels in the anti-glare image;
    wherein in the anti-glare image, each pixel with the grayscale value greater than the preset threshold is defined as a mask pixel, and each pixel with the grayscale value equal to the lower limit is defined as a non-mask pixel;
    wherein the processor sets each mask pixel in the anti-glare image as a base to define an M×N matrix according to the base, sets the non-mask pixel in the M×N matrix as an auxiliary mask pixel, and sets the grayscale value of the auxiliary mask pixel to be equal to the grayscale value of the corresponding pixel of the grayscale image, wherein M and N are positive integers greater than or equal to 2;
    wherein the transparent display displays according to the grayscale values of the mask pixels and the grayscale values of the auxiliary mask pixels in the anti-glare image.

2. The intelligent transparent light-shielding system as claimed in claim 1, wherein
    the processor converts the grayscale image into a thresholding image according to the preset threshold, and then converts the grayscale image into the anti-glare image according to pixel information of the thresholding image; wherein each pixel in the thresholding image has an intensity value;
    when the processor converts the grayscale image into the anti-glare image, the grayscale value in the anti-glare image corresponding to the pixel whose intensity value in the thresholding image is equal to the lower-limit value is set to be the lower-limit value, and the grayscale value in the anti-glare image corresponding to the pixel whose intensity value in the thresholding image is equal to an upper-limit value is maintained as in the grayscale image.

3. The intelligent transparent light-shielding system as claimed in claim 2, wherein
    in the grayscale image, the grayscale value is equal to or greater than the lower-limit value and equal to or less than the upper-limit value;
    in the thresholding image, the intensity value is equal to the lower-limit value or equal to the upper-limit value.

4. The intelligent transparent light-shielding system as claimed in claim 3, wherein the lower-limit value is equal to 0, the upper-limit value is equal to 255, and the preset threshold is a value equal to or greater than 160 and equal to or less than 240.

5. The intelligent transparent light-shielding system as claimed in claim 1, wherein the processor directly sets the pixels of the grayscale image with the grayscale values equal to or lower than the preset threshold as the pixels of the anti-glare image with the grayscale values equal to the lower-limit value, and directly sets the pixels of the grayscale image with the grayscale values greater than the preset threshold as the pixels of the anti-glare image with the grayscale value greater than the preset threshold.

6. The intelligent transparent light-shielding system as claimed in claim 5, wherein
    in the grayscale image, the grayscale value is equal to or greater than the lower-limit value and equal to or less than an upper-limit value.

7. The intelligent transparent light-shielding system as claimed in claim 6, wherein the lower-limit value is equal to 0, the upper-limit value is equal to 255, and the preset threshold is a value equal to or greater than 160 and equal to or less than 240.

8. The intelligent transparent light-shielding system as claimed in claim 1, wherein the mask pixel as the base is a center pixel or a non-center pixel of the M×N matrix.

9. The intelligent transparent light-shielding system as claimed in claim 1, wherein the transparent display is a transparent liquid crystal display panel or a transparent organic light emitting diode display panel in a configuration of eyeglass lens, and is mounted in an eyeglass frame.

10. An intelligent transparent light-shielding system applied to a vehicle and comprising:
    a camera generating an original driving image;
    a transparent display displaying an anti-glare image; and
    a processor signally connected to the camera and the transparent display, receiving the original driving image from the camera, converting the original driving image into a grayscale image, converting the grayscale image into the anti-glare image according to a preset threshold, and transmitting the anti-glare image to the transparent display for display;
    wherein each pixel in the grayscale image has a grayscale value, and each pixel in the anti-glare image has a grayscale value;
    wherein the pixels in the grayscale image with the grayscale values equal to or lower than the preset threshold respectively correspond to the pixels in the anti-glare image with the grayscale values equal to a lower-limit value;

wherein the pixels in the grayscale image with the grayscale values greater than the preset threshold respectively correspond to the pixels in the anti-glare image with the grayscale values greater than the preset threshold;

wherein a light-shielding rate of the transparent display corresponds to the grayscale values of the pixels in the anti-glare image;

wherein in the anti-glare image, each pixel with the grayscale value greater than the preset threshold is defined as a mask pixel, and each pixel with the grayscale value equal to the lower-limit value is defined as a non-mask pixel;

wherein the processor sets each mask pixel in the anti-glare image as a base to define an M×N matrix according to the base, sets the non-mask pixel in the M×N matrix as an auxiliary mask pixel, and sets the grayscale value of the auxiliary mask pixel to be equal to the preset threshold, wherein M and N are positive integers greater than or equal to 2;

wherein the transparent display displays according to the grayscale values of the mask pixels and the grayscale values of the auxiliary mask pixels in the anti-glare image.

11. The intelligent transparent light-shielding system as claimed in claim 10, wherein the mask pixel as the base is a center pixel or a non-center pixel of the M×N matrix.

12. An intelligent transparent light-shielding system applied to a vehicle and comprising:

a camera generating an original driving image;

a transparent display displaying an anti-glare image; and a processor signally connected to the camera and the transparent display, receiving the original driving image from the camera, converting the original driving image into a grayscale image, converting the grayscale image into the anti-glare image according to a preset threshold, and transmitting the anti-glare image to the transparent display for display;

wherein each pixel in the grayscale image has a grayscale value, and each pixel in the anti-glare image has a grayscale value;

wherein the pixels in the grayscale image with the grayscale values equal to or lower than the preset threshold respectively correspond to the pixels in the anti-glare image with the grayscale values equal to a lower-limit value;

wherein the pixels in the grayscale image with the grayscale values greater than the preset threshold respectively correspond to the pixels in the anti-glare image with the grayscale values greater than the preset threshold;

wherein a light-shielding rate of the transparent display corresponds to the grayscale values of the pixels in the anti-glare image;

wherein the processor converts the grayscale image into a thresholding image according to the preset threshold, and then converts the grayscale image into the anti-glare image according to pixel information of the thresholding image; wherein each pixel in the thresholding image has an intensity value;

wherein when the processor converts the grayscale image into the anti-glare image, the grayscale value in the anti-glare image corresponding to the pixel whose intensity value in the thresholding image is equal to the lower-limit value is set to be the lower-limit value, and the grayscale value in the anti-glare image corresponding to the pixel whose intensity value in the thresholding image is equal to an upper-limit value is maintained as in the grayscale image;

wherein in the thresholding image, each pixel with the intensity value equal to the upper-limit value is defined as a mask pixel, and each pixel with the intensity value equal to the lower-limit value is defined as a non-mask pixel;

wherein the processor sets each mask pixel in the thresholding image as a base to define an M×N matrix according to the base, sets the non-mask pixel in the M×N matrix as an auxiliary mask pixel, and sets the intensity value of the auxiliary mask pixel to be equal to the upper-limit value to form a transitional image, wherein each pixel of the transitional image has a grayscale value;

wherein the processor sets the grayscale values of the mask pixels and the auxiliary mask pixels of the transitional image to be equal to the grayscale values of the corresponding pixels of the grayscale image;

wherein the transparent display displays according to the grayscale values of the mask pixels and the grayscale values of the auxiliary mask pixels in the anti-glare image.

13. The intelligent transparent light-shielding system as claimed in claim 12, wherein the mask pixel as the base is a center pixel or a non-center pixel of the M×N matrix.

* * * * *